United States Patent
Murta et al.

(10) Patent No.: US 10,227,127 B2
(45) Date of Patent: Mar. 12, 2019

(54) FIBER METAL LAMINATE REINFORCED WING SPAR FOR RETRACTABLE UNDERWING MOUNTED LANDING GEAR ASSEMBLIES

(71) Applicant: EMBRAER S.A., Sao Jose dos Campos-SP (BR)

(72) Inventors: Yvan Bovolenta Murta, São Jose dos Campos-SP (BR); Willy Roger de Paula Medonça, São Jose dos Campos-SP (BR); Marcelo Ricardo Bertoni Rodrigues, São Jose dos Campos-SP (BR); Danielle Fátima Nunes Rebello da Silva, São Jose dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 190 days.

(21) Appl. No.: 15/219,420

(22) Filed: Jul. 26, 2016

(65) Prior Publication Data

US 2018/0029689 A1 Feb. 1, 2018

(51) Int. Cl.
  *B64C 3/18* (2006.01)
  *B64C 25/10* (2006.01)
  *B64C 25/04* (2006.01)
  *B64C 25/34* (2006.01)

(52) U.S. Cl.
  CPC .............. *B64C 3/185* (2013.01); *B64C 25/04* (2013.01); *B64C 25/10* (2013.01); *B64C 25/34* (2013.01)

(58) Field of Classification Search
  CPC ......... B64C 25/34; B64C 3/185; B64C 25/10; B64C 25/405; B64C 25/04; B64C 3/187; B64C 3/20; B64C 3/26
  See application file for complete search history.

(56) References Cited

U.S. PATENT DOCUMENTS

| | | | | |
|---|---|---|---|---|
| 3,687,400 A | * | 8/1972 | Fitzgerald | B64C 25/34 244/102 R |
| 4,177,306 A | * | 12/1979 | Schulz | B29C 70/085 428/107 |
| 4,425,980 A | * | 1/1984 | Miles | B64C 1/40 181/208 |
| 4,786,343 A | * | 11/1988 | Hertzberg | B29C 65/48 112/423 |
| 4,966,802 A | * | 10/1990 | Hertzberg | B29C 65/601 112/423 |
| 5,866,272 A | * | 2/1999 | Westre | B32B 3/12 428/593 |
| 5,935,698 A | * | 8/1999 | Pannell | B29C 65/344 428/102 |

(Continued)

Primary Examiner — Assres H Woldemaryam
(74) Attorney, Agent, or Firm — Nixon & Vanderhye P.C.

(57) ABSTRACT

Reinforced wing spars for underwing mounted retractable landing gear assemblies include a unitary (one-piece) metal wing spar having a central web and an upper spar flange, a trunnion mounted in the web of the wing spar for pivotally receiving a transverse mounting tube of a retractable landing gear strut, and a reinforcement laminate adhered to and extending along the upper spar flange above the trunnion, wherein the reinforcement laminate is comprised of at least one fiber reinforced composite layer alternately interposed with at least one metal reinforcement layer.

10 Claims, 4 Drawing Sheets

(56) References Cited

U.S. PATENT DOCUMENTS

| | | | | |
|---|---|---|---|---|
| 6,374,570 B1* | 4/2002 | McKague, Jr. | ......... | B29C 65/56 |
| | | | | 52/156 |
| 7,080,805 B2* | 7/2006 | Prichard | ................... | B64C 1/12 |
| | | | | 244/117 R |
| 7,874,518 B2* | 1/2011 | Pham | ................... | B29C 66/474 |
| | | | | 244/132 |
| 8,042,768 B2* | 10/2011 | Liguore | ................ | B29C 70/088 |
| | | | | 181/208 |
| 8,622,346 B2* | 1/2014 | Buchs | .................. | B29C 66/112 |
| | | | | 244/119 |
| 8,720,825 B2* | 5/2014 | Kismarton | ............ | B29C 65/562 |
| | | | | 244/129.1 |
| 8,851,422 B2* | 10/2014 | Dan-Jumbo | .............. | B64C 3/20 |
| | | | | 244/123.1 |
| 8,974,885 B2 | 3/2015 | Ohrloff et al. | | |
| 9,415,858 B2* | 8/2016 | Dan-Jumbo | .............. | B32B 7/02 |
| 2006/0038071 A1* | 2/2006 | Schoene | ............ | B64D 11/0696 |
| | | | | 244/118.6 |
| 2006/0237584 A1* | 10/2006 | Hinton | ................... | B64C 25/10 |
| | | | | 244/102 R |
| 2012/0082547 A1* | 4/2012 | Baker | ................... | F03D 1/0675 |
| | | | | 416/1 |
| 2014/0054418 A1 | 2/2014 | Plokker et al. | | |

\* cited by examiner

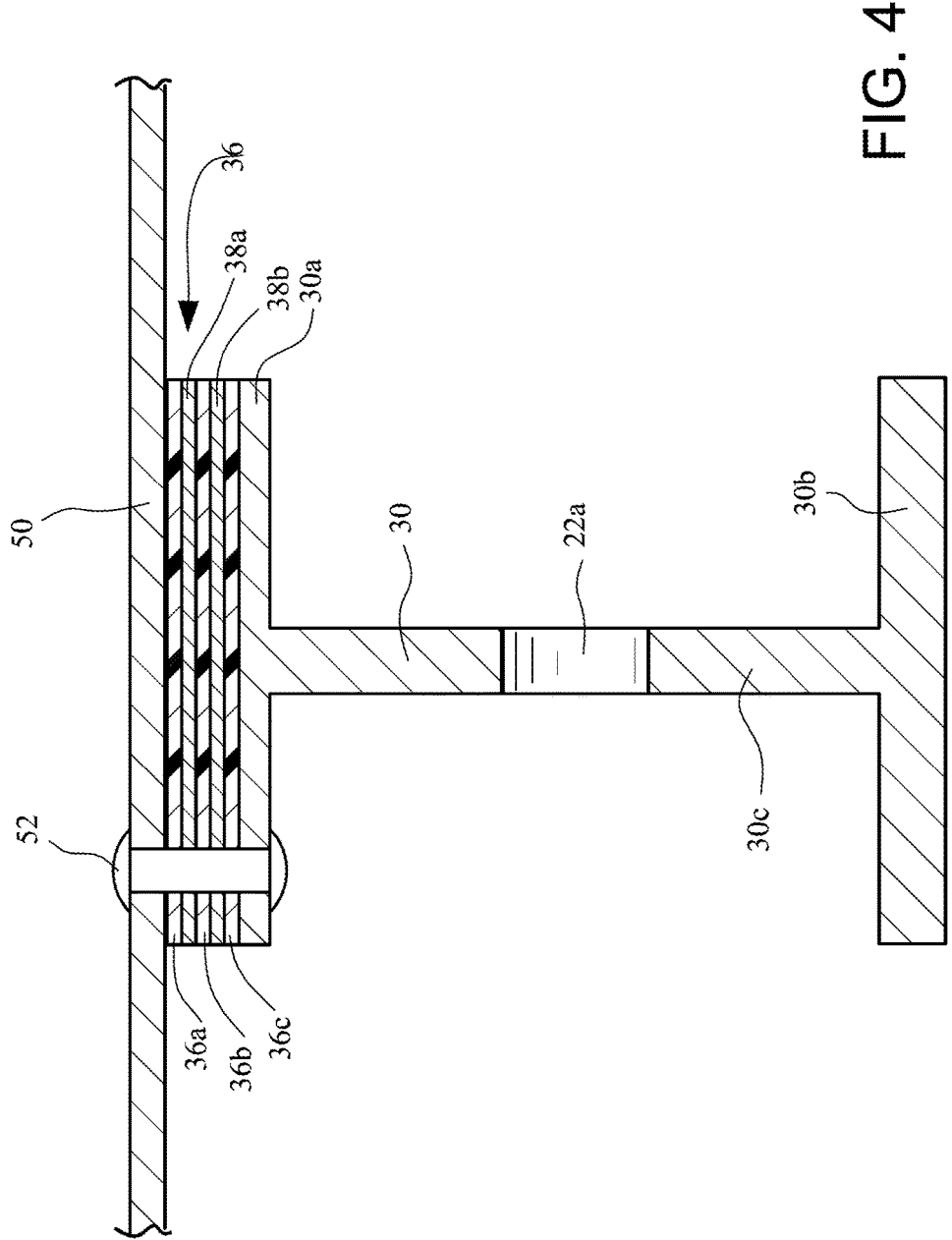

FIBER METAL LAMINATE REINFORCED WING SPAR FOR RETRACTABLE UNDERWING MOUNTED LANDING GEAR ASSEMBLIES

FIELD

The embodiments disclosed herein relate generally to aircraft with wing-mounted retractable landing gear assemblies, particularly wing beams in which a landing gear pin is mounted to allow the landing gear to be pivotally moved between stowed (retracted) and deployed (extended) positions.

BACKGROUND

Aircraft having under-wing mounted retractable landing gear assemblies are well known. In general, such landing gear configurations are comprised of a vertical leg strut connected to the axle of the landing gear wheels. The vertical leg strut is also connected to a horizontal support tube that is pivoted at its ends around its longitudinal axis in order to allow rotation of such tube and therefore movement of the landing gear between deployed and stowed positions. The ends of the support tube connect with the wing structure by means of trunnion fittings. Even though the landing gear has other points of interface with the wing structure, the trunnion fittings are the most significant interface point with the wing structure as they are the main load path from the vertical leg strut to the wing structure.

The horizontal support tube is closely aligned with the forward aircraft direction. Hence, the trunnion fittings may be referenced as front and rear trunnions in relation to the forward travel direction of the aircraft. Common aircraft design places the front trunnion relatively close to wing main box rear spar with rear trunnion further aft. Thus, a dedicated structural element to carry the rear trunnion loads is necessary according to such conventional design. The conventional landing gear design typically therefore locates a beam (or a spar) close to the rear trunnion position so that such beam will carry its loads to the main wing box structure and fuselage. Loads are reacted by the beam as shear and bending moments.

The common manufacturing process for the beam is to machine a metal billet of e.g., aluminum, steel or titanium to the designed shape. Such manufacturing fashion is referred to in this document as integral structures. The rear trunnion may be an integral part of the beam or be a fitting attached by means of fasteners. The beam may or may not be connected to upper and lower covers which form part of the external aerodynamic profile. The beam cross-sections may be, but are not limited to, "I", "C", "Z" or any other suitable geometries. The vertical part of the cross section is referred to as beam web. The web may or may not have vertical elements to increase its strength which are referred to as upright stiffeners. The beam web is connected at its upper and lower boundaries to horizontal elements which are referred to as upper and lower flanges.

Aircraft aerodynamic performance has been pushing designers to reduce aerodynamic profile thickness, thereby limiting available room for systems and structures. Since external loads are high and available space is limited, the structure is subjected to high internal loads. Such loads may be compressive or tensile loads depending on the part of the structure and the direction of external loads applied. These high loads occur several times throughout the aircraft service life. When high tensile loads are cyclic, they become critical for fatigue and damage tolerance. The term "damage tolerance" is hereby meant as the structure capability to withstand loads after its initial designed strength has been lowered by the presence of a crack. Such a crack is considered to occur after an initial flaw has propagated under cyclic loads present during normal aircraft operation.

The wing beam carrying the rear trunnion loads is an integral structure having low damage tolerance capabilities. Hence, in order to meet stringent maintenance requirements, designers must increase structure weight, mandate more sophisticated inspection methods, reduce inspection intervals, or any combination of such factors.

It would be therefore be desirable if wing beams carrying the under-wing landing gear trunnion loads could be provided with high damage tolerance capabilities without significantly increasing airframe structure weight. It is towards providing such a solution that the embodiments disclosed herein are directed.

SUMMARY

In order to improve the integral beam damage tolerance capability, a laminated reinforcement is provided in accordance with the embodiments disclosed herein. Such laminated reinforcement comprises a plurality of alternating sheet metal layers and fiber composite reinforcement layers. Metal sheets may be made of, but are not limited to, aluminum, steel, titanium and the like.

Fiber composite materials are generally described as being materials that include reinforcing fibers, such as graphite fibers, embedded in a polymeric matrix, such as an epoxy resin. Such materials will hereinafter be referenced as "fiber-reinforced composite" materials. Fiber-reinforced composite materials are usually supplied as fibrous sheets pre-impregnated with a curable or partially cured resin. The so-called "prepreg sheets" may then be laid up in laminated plies and cured to form rigid sheets. Fibers are embedded in an adhesive matrix that connects the fibers to adjacent metal layers. Fibers may be made of, but are not limited to, fiberglass, carbon, boron, aramid and the like. The adhesive matrix of the prepreg fiber layers may be made of, but are not limited to, epoxy or other adhesive polymers.

The laminated reinforcement is bonded at least with one adhesive layer and at least one fiber-reinforced composite to the top flange of the wing spar. The wing spar may be a unitary structure which is machined from a billet of aluminum, steel, titanium or other suitable metal. The reinforcement stacking is constructed by bonding alternating layers of fiber-reinforced composite and metal sheets on the top of the unitary wing spar.

The joining of the layers by bonding makes the load transfer among such layers very efficient. Moreover, the use of fibers in the fiber-reinforced composite, which are resistant to cyclic loads, creates a phenomenon known as bridging along crack lines thereby reducing stress concentration factors and therefore slowing crack propagation. The bridging is effective in reducing crack propagation not only in the laminated reinforcement but also in the integral structure.

According to certain embodiments, therefore, reinforced wing spars for retractable landing gear assemblies will include a unitary (one-piece) metal wing spar having a central web and an upper spar flange, a trunnion mounted in the web of the wing spar for pivotally receiving a transverse mounting tube of a retractable landing gear strut, and a reinforcement laminate adhered to and extending along the upper spar flange above the trunnion, wherein the reinforcement laminate is comprised of at least one fiber reinforced composite layer alternately interposed with at least one metal reinforcement layer. Preferably a plurality of the fiber reinforced composite layers are alternately interposed with a plurality of the metal reinforcement layers.

The wing spar may thus be a unitary structure machined from a unitary metal billet having an I-shaped, C-shaped or Z-shaped cross-sectional geometry. The fiber-reinforced composite layer may be comprised of reinforcing fibers embedded in a resin matrix, e.g., fibers selected from the group consisting of glass fibers, carbon fibers, boron fibers and aramid fibers embedded in an epoxy matrix.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 4 is an enlarged cross-sectional elevational view of the laminate reinforced wing beam spar as taken along line 4-4 of FIG. 3.

DETAILED DESCRIPTION

Figure 1:
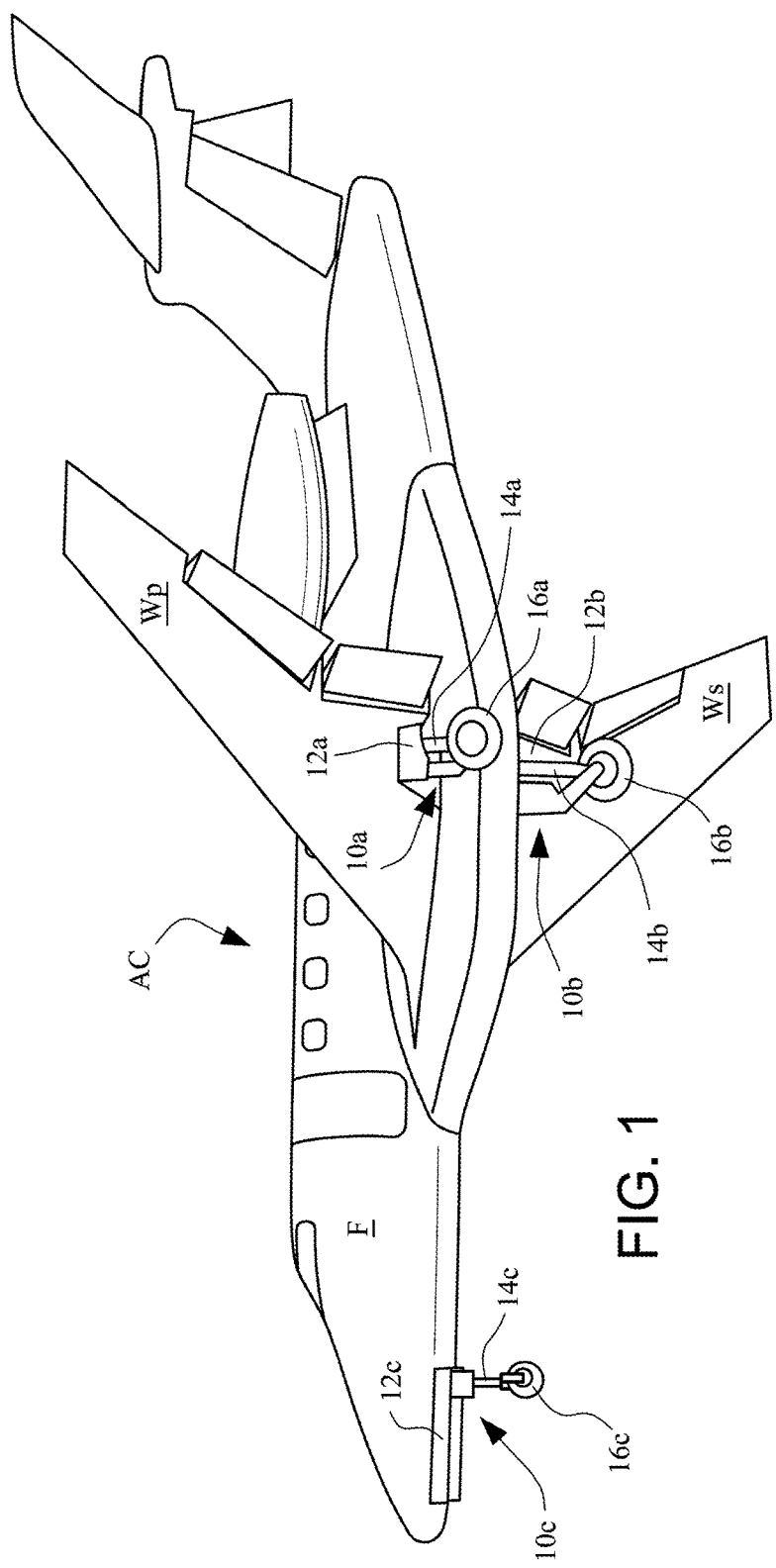
FIG. 1 is a bottom perspective view of an aircraft showing the landing gear in a deployed (extended) position.

Accompanying FIG. 1 depicts an aircraft AC having retractable landing gear consisting of port and starboard main landing gear assemblies 10a, 10b and a nose gear assembly 10c all shown in a deployed (extended) position. As can be seen, the main landing gear assemblies 10a, 10b are mounted underneath the port and starboard wings $W_p$, $W_s$, respectively, and thus may be retracted (stowed) therewithin in order to reduce drag during certain flight phases of the aircraft AC. In order to further reduce drag, the main landing gear assemblies 10a, 10b may be covered by appropriate gear doors 12a, 12b cooperatively attached to the main landing gear struts 14a, 14b, respectively. Each of the gear struts 14a, 14b carries a main landing wheel and tire assembly 16a, 16b, respectively. In a similar manner, the nose gear assembly 10c includes a nose gear strut 14c which carrying a nose wheel and tire assembly 16c which may be retracted into the forward portion of the fuselage F and covered by nose gear doors 12c.

Figure 2:
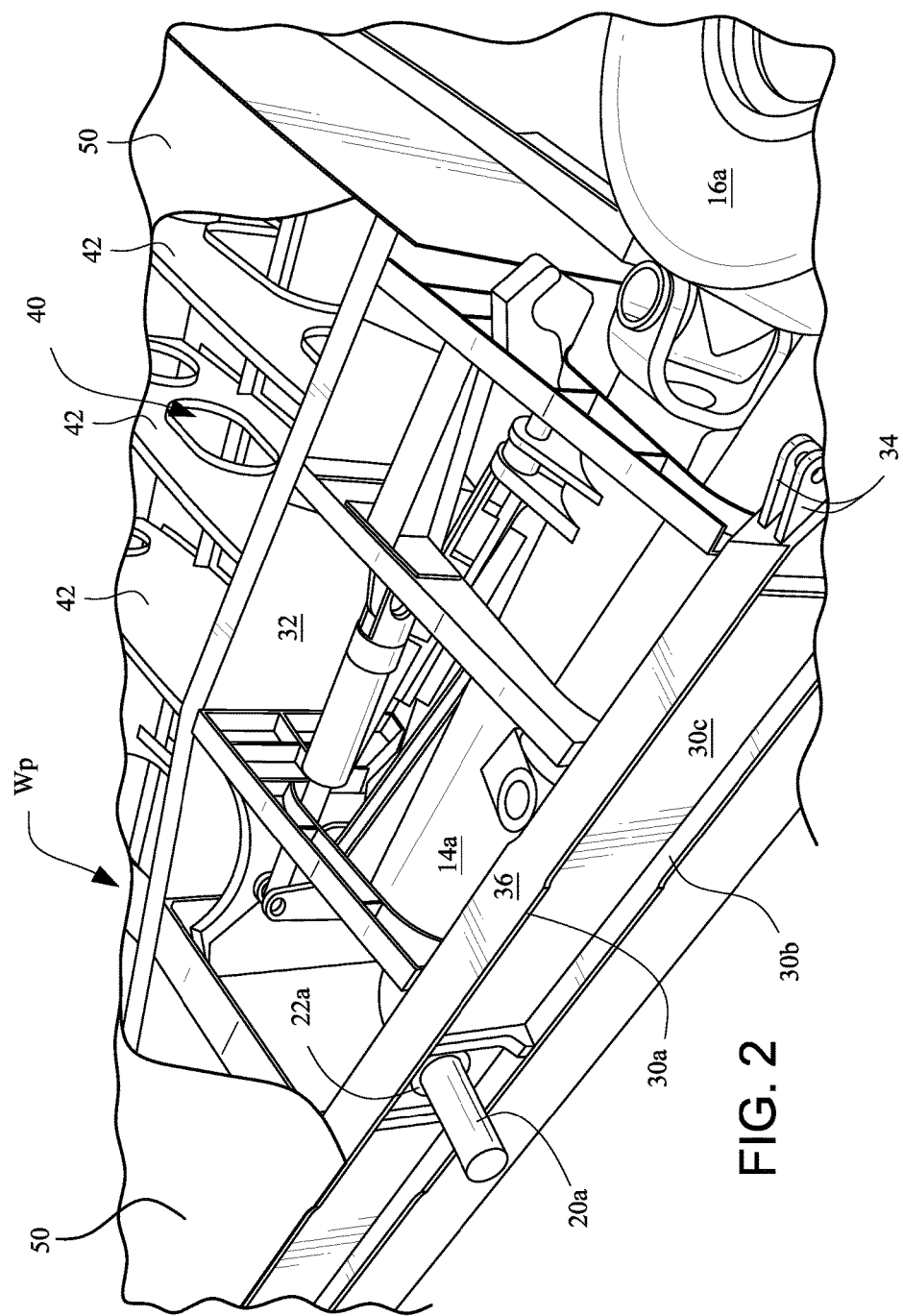
FIG. 2 is an enlarged detailed view of the wing box and wing spars supporting a main landing gear assembly of the aircraft depicted in FIG. 1 and shown with the wing skin removed and the main landing gear in a stowed (retracted) position for clarity.

A detailed view of the main landing gear assembly 10a of the port wing $W_p$ is depicted in FIG. 2 in a stowed (retracted) position in FIG. 2. Such a depiction and the description thereof which follows pertaining to the landing gear assembly 10a of the port wing $W_p$ is equally applicable to the mirror image arrangement of the main landing gear assembly 10b associated with the starboard wing $W_s$. As can be seen, the upper end of the landing gear strut 14a includes a horizontal support tube 20a having a rear end thereof pivotally mounted to the trunnion 22a provided in the wing spar 30. The opposite (forward end) of the support tube 20a may be pivotally connected to a trunnion (not shown) associated with the rear spar 32 of the main wing box 40. The wing spar 30 includes mounting brackets 34 for attachment to the airframe structure of the fuselage F. Wing ribs 42 are provided so that when the wing skin 50 is attached to the ribs 42 and to the upper and lower flanges 30a, 30b of the wing spar 30, an aerodynamic profile of the wing $W_p$ will be defined.

Figure 3:
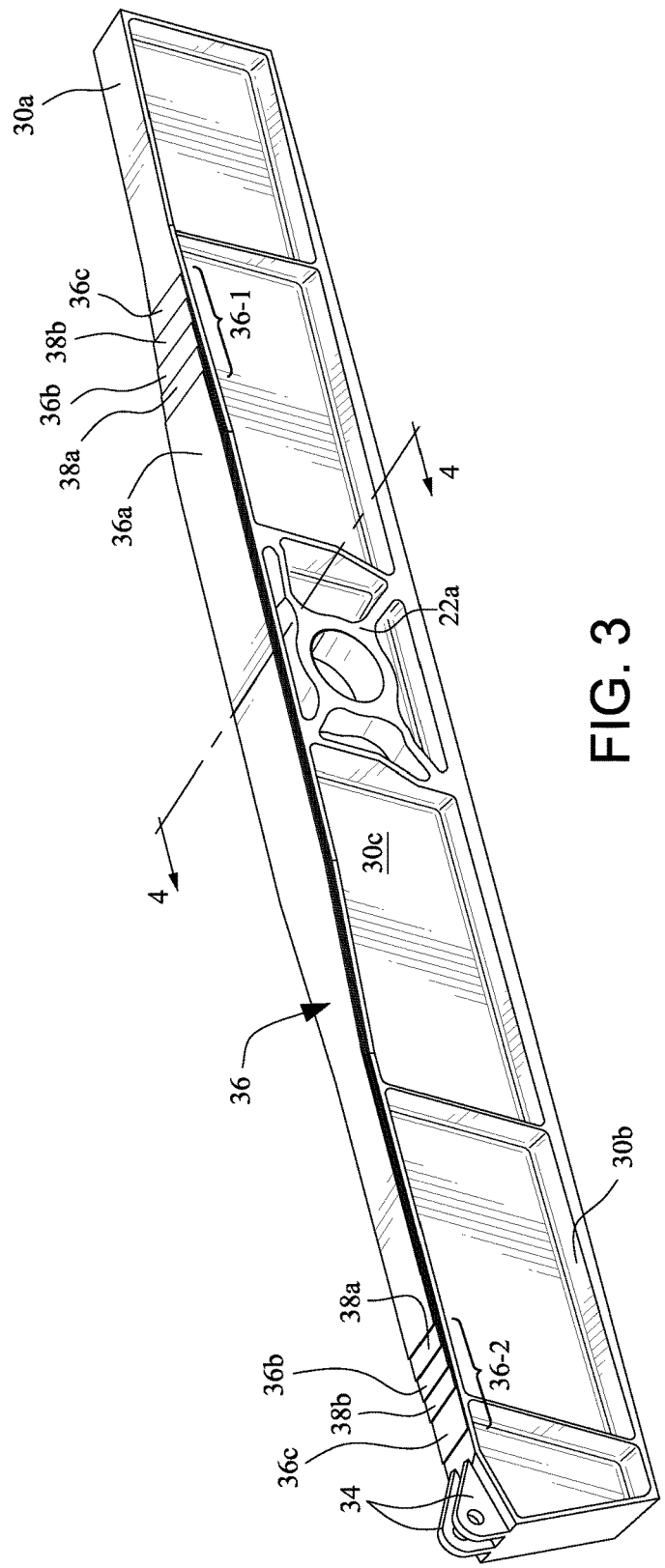
FIG. 3 is an isolated perspective view of a laminate reinforced wing beam spar carrying a landing gear trunnion employed in wing box shown in FIG. 2.

As is perhaps better shown in FIGS. 3 and 4, the wing spar 30 is generally a beam structure having upper and lower flanges 30a, 30b separated by an upright web 30c. The upper flange 30a of the wing spar 30 is reinforced at least in the vicinity of the trunnion 22a with multiple laminated reinforcement layers 36 which in the embodiment depicted comprise alternating fiber-reinforced composite layers 36a, 36b and 36c (e.g., glass, carbon or other reinforcing fibers in a cured adhesive) interposed between the upper flange 30a and alternating metal sheet reinforcing layers 38a, 38b (e.g., sheets of aluminium, titanium and the like). As can be seen in FIG. 3, the layers 36a-36c on the one hand and 38a-38b on the other hand extend lengthwise along the upper flange 30a of the wing spar 30 above the trunnion 22a and taper at opposite lateral edges 36-1, 36-2 so as to expose lateral ends of the alternating fiber-reinforced composite layers 36a, 36b and 36c and metal sheet reinforcing layers 38a, 38b.

The wing spar 30 is preferably formed by machining the wing spar from a solid billet of metal (e.g., aluminum) and thereafter assembling the stack of prepreg fiber adhesive layers 36a, 36b, 36c alternately with the metal reinforcement sheets 38a, 38b. The wing spar with the assembled reinforcement stack of layers 36 may then be subjected to heat and/or pressure curing conditions so as to fully cure the prepreg fiber adhesive layers 36a-36c and bond such layers to the interposed metal reinforcement layers 36a-36b. During assembly of the wing, the wing skin 50 (e.g., aluminum sheet) may thereafter be fastened to the stack of prepreg fiber adhesive layers 36a, 36b, 36c and metal reinforcement sheets 38a, 38b by means of conventional rivets 52. Crack propagation in the laminated metal sheet reinforcement layers 38a, 38b will be much slower than in the wing spar 30 due to the presence of the interposed prepreg fiber adhesive layers 36a, 26b, 36c, respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
a wing box comprising a reinforced wing spar for supporting a retractable landing gear assembly;
wing ribs; and
wing skin attached to the wing ribs and wing spars to define an aerodynamic profile for the aircraft wing, wherein
the reinforced wing spar comprises:
(i) a unitary metal wing spar machined from a unitary metal billet having a central web and an upper spar flange;
(ii) a trunnion mounted in the web of the wing spar for pivotally receiving a transverse mounting tube of a retractable landing gear strut; and (iii) a reinforcement laminate adhered to and extending along the upper spar flange above the trunnion, wherein the reinforcement laminate is comprised of a plurality of fiber reinforced composite layers alternately interposed with a plurality of metal reinforcement layers, and wherein opposite lateral edges of the reinforcement laminate are tapered to as to respectively expose lateral ends of each of the fiber reinforced composite and metal layers.

2. The aircraft wing as in claim 1, wherein the reinforced wing spar has an I-shaped, C-shaped or Z-shaped cross-sectional geometry.

3. The aircraft wing as in claim 1, wherein the fiber-reinforced composite layer is comprised of reinforcing fibers embedded in a resin matrix.

4. The aircraft wing as in claim 3, wherein the reinforcing fibers are selected from the group consisting of glass fibers, carbon fibers, boron fibers and aramid fibers.

5. The aircraft wing as in claim 4, wherein the resin matrix is comprised of an epoxy adhesive.

6. An aircraft comprising:
a fuselage;
wings extending from the fuselage, and
retractable landing gear assemblies having a transverse mounting tube of a retractable landing gear strut operatively mounted under the wings for pivotal deployment between retracted and extended positions, wherein each of the wings comprises:
(a) a wing box comprising a reinforced wing spar for supporting a retractable landing gear assembly;
(b) wing ribs; and
(c) wing skin attached to the wing ribs and wing spars to define an aerodynamic profile for the aircraft wing, wherein
(d) the reinforced wing spar of the wing box comprises:
(i) a unitary metal wing spar machined from a unitary metal billet having a central web and an upper spar flange;
(ii) a trunnion mounted in the web of the wing spar for pivotally receiving the transverse mounting tube of the retractable landing gear strut; and
(iii) a reinforcement laminate adhered to and extending along the upper spar flange above the trunnion, wherein the reinforcement laminate is comprised of a plurality of fiber reinforced composite layers alternately interposed with a plurality of metal reinforcement layers, and wherein opposite lateral edges of the reinforcement laminate are tapered to as to respectively expose lateral ends of each of the fiber reinforced composite and metal layers.

7. The aircraft as in claim 6, wherein the reinforced wing spar has an I-shaped, C-shaped or Z-shaped cross-sectional geometry.

8. The aircraft as in claim 6, wherein the fiber-reinforced composite layer is comprised of reinforcing fibers embedded in a resin matrix.

9. The aircraft as in claim 8, wherein the reinforcing fibers are selected from the group consisting of glass fibers, carbon fibers, boron fibers and aramid fibers.

10. The aircraft as in claim 9, wherein the resin matrix is comprised of an epoxy adhesive.

* * * * *